United States Patent Office 3,022,356
Patented Feb. 20, 1962

3,022,356
PROCESS FOR PREPARING BIS(ω-HYDROPER-FLUOROALKYL) CARBINOLS
Charles D. Ver Nooy III, Newark, Del., assignor to E. I. du Pont de Nemours and Company, Wilmington, Del., a corporation of Delaware
No Drawing. Filed Oct. 16, 1958, Ser. No. 767,500
3 Claims. (Cl. 260—633)

This invention is directed to novel bis(ω-hydroperfluoroalkyl) carbinols and a method for their manufacture. Specifically, this invention concerns secondary fluorinated alcohols having the structure:

$$\text{H(CF}_2\text{CF}_2)_n-\underset{\underset{\text{H}}{|}}{\overset{\overset{\text{OH}}{|}}{\text{C}}}-(\text{CF}_2\text{CF}_2)_m\text{H}$$

wherein $n$ and $m$ are integers from 1 to 5. These secondary alcohols are useful intermediates for conversion to other compounds. They may, for example, be converted into ω,ω'-dihydroperfluoro aliphatic hydrocarbons and ω-hydroperfluoro aliphatic carboxylic acids. They may also be converted to the corresponding ω,ω'-dihydroperfluoro aliphatic ketones. The carbinols of this invention are useful as the operative solvent in absorption refrigeration systems. They also find significant utility as surface-active agents.

Dialkylcarbinols are very old in the art. In the past eight years, the discovery of methanol-tetrafluoroethylene telomerization reactions has introduced 1,1,ω-trihydroperfluoroalkanols (primary fluorinated alcohols) and secondary alcohols of the structure $$\text{H(CF}_2\text{CF}_2)_n\overset{\overset{\text{R}}{|}}{\text{C}}\text{HOH}$$

wherein R is CH₃—, CH₃CH₂—, ClCH₂—, etc. No one has previously disclosed bis(ω-hydroperfluoroalkyl)carbinols. Had they been considered, the prior art teaches preparative methods that are multi-stepped and uneconomical. For example, 1,1,ω-trihydroperfluoroalkanol could be converted to aldehyde and reacted with the proper, but difficultly prepared, Grignard reagent to produce the desired secondary fluorinated alcohol. Alternatively, as Henne et al., J. Am. Chem. Soc., 75,991 (1953) have done with bis(perfluoropropyl)carbinol, through a multi-step process, the bis(ω-hydroperfluoroalkyl) ketone could be prepared and then reduced to the secondary alcohol.

It is, therefore, an object of the present invention to provide novel bis(ω-hydroperfluoroalkyl)carbinols. It is another object to provide a novel and commercially attractive method for the manufacture of said carbinols. These and other objects will be apparent from the specification and claims.

More specifically, the present invention is directed to novel bis(ω-hydroperfluoroalkyl)carbinols of the structure $$\text{H(CF}_2\text{CF}_2)_n\overset{\overset{\text{OH}}{|}}{\text{C}}\text{H(CF}_2\text{CF}_2)_m\text{H}$$

wherein $n$ and $m$ are integers having a value of from 1 to 5.

This invention is also directed to a novel process for the preparation of bis(ω-hydroperfluoroalkyl)carbinols having the structure $$\text{H(CF}_2\text{CF}_2)_n\overset{\overset{\text{OH}}{|}}{\text{C}}\text{H(CF}_2\text{CF}_2)_m\text{H}$$

wherein $n$ and $m$ are integers having a value of from 1 to 5, which process comprises the steps of (a) telomerizing tetrafluoroethylene and methanol in the presence of a free-radical generator taken from the group consisting of peroxides and azo nitriles; (b) esterifying the primary alcohols from the resulting mixture of primary and secondary alcohols with a stoichiometric amount of any acidic compound taken from the group consisting of mono-carboxylic acids, poly-carboxylic acids, mono-carboxylic acid anhydrides and poly-carboxylic acid anhydrides; and (c) distilling the resulting mixture to separate the bis(ω-hydroperfluoroalkyl)carbinols from the esters of the primary alcohols, the 1,1,ω-trihydroperfluoroalkan-1-ols.

The process for preparing the novel compositions of this invention encompasses beginning with the method described in U. S. Patent No. 2,559,628 for telomerizing tetrafluoroethylene and methanol in the presence of free-radical generators. Preferably, 1 to 10 mols of methanol are heated with one mol of tetrafluoroethylene under a pressure of one (1) to 100 atmospheres at a temperature within the range of 50° C. to 250° C. The presence of a free-radical generator is required in the amount of 0.01% to 10% based on the weight of methanol used. Free-radical generators which are operable are peroxy and azo compounds as described in U.S. Patent No. 2,559,628, column 8, lines 38 to 61 as follows: organic and inorganic peroxy compounds including diacyl peroxides, such as benzoyl peroxide and lauroyl peroxide; alkyl peroxides, such as diethyl peroxide and tertiary butyl hydroperoxide; inorganic peroxides, such as hydrogen peroxide; salts of peracids, such as ammonium persulfate, sodium perborate and potassium percarbonate, oxygen; ozone and the like.

Azo catalysts operative to practice the present invention include carbamylazoisobutyronitrile, alpha, alpha'-azodiisobutyronitrile, alpha,alpha'-azobis (alpha, gamma-dimethylvaleronitrile), alpha, alpha'-azobis (alpha-phenylpropionitrile), alpha, alpha'-azobis (alpha, gamma-dimethyl-gamma-methoxyvaleronitrile), 1,1'-azodicyclohexanecarbonitrile, alpha,alpha'-azo-diisobutyramide, and dimethyl alpha,alpha'-azodiisobutyrate. These compounds may be prepared by the methods of Thiele and Heuser, Ann. 290, 1–43 (1896), or Hartmann, Rec. trav. chim. 46, 150–153 (1927).

On completion of the telomerization step, the reaction mixture is distilled, separation into fractions containing alcohols of equal number of carbon atoms is effected by this distillation. However, separation of the major product primary alcohol, $\text{H(CF}_2\text{CF}_2)_{n+m}\text{CH}_2\text{OH}$, from the desired product secondary alcohol, $$\text{H(CF}_2\text{CF}_2)_n\overset{\overset{\text{OH}}{|}}{\text{C}}\text{H(CF}_2\text{CF}_2)_m\text{H}$$

is impossible by distillation because of the close proximity of boiling points of the two alcohols. Each portion of isomeric alcohol mixture is treated with approximately a stoichiometric amount of an esterifying agent with or without the presence of a solvent. The mixture is heated at 100° to 200° C. for about 4 to 200 hours, or, until the theoretical quantity of water of condensation is azeotropically removed. The rate of esterification of primary alcohol is significantly more rapid than that of secondary alcohol. Consequently, at the end of the specified period the mixture contains unreacted bis(ω-hydroperfluoroalkyl) carbinol and the ester of 1,1,ω-trihydroperfluoroalkan-1-ol. These two compounds may then be separated by distillation.

The esterifying agents which are operable in this process include any monocarboxylic acid, polycarboxylic acid or their anhydride. The preferred esterifying agents are those resulting in high-boiling esters of the primary alcohols to facilitate their separation from the desired bis(ω-hydroperfluoroalkyl)carbinols. In addition to monofunctional acids and their anhydrides, cyclic and acyclic acids or their derivatives containing more than one carboxylic functional group are useful. Representative examples include camphoric acid, camphoric anhydride, pyromellitic acid, pyromellitic anhydride, phthalic acid, phthalic anhydride, terephthalic acid, hexahydroterephthalic acid, trimellitic acid, trimellitic anhydride, 3-methylglutaric acid, 3-methylglutaric anhydride, glutaric acid, glutaric anhydride, adipic acid, pinic acid, sebacic acid, diglycollic acid, diglycollic anhydride, thioglycollic acid, thoglycollic anhydride, tricarballylic acid, and 3-tert-butyladipic acid, in addition to acetic acid, acetic anhydride, butyric acid, butyric anhydride, 2-ethylhexanoic acid, palmitic acid, oleic acid, stearic acid and the like. The esterification step may be aided by adding solvents as diluents; these must, of course, be inert to the reaction, i.e., not take part in esterification. Such solvents as benzene, toluene, and carbon tetrachloride are operable.

The novel fluorinated alcohols obtained according to the process of this invention,

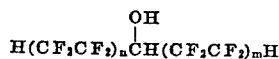

are colorless liquids where the sum of $n+m$ is in the range of 2 to 5. Above a value of 5 for the sum of $n+m$, the compounds become low-melting solids. These bis(ω-hydroperfluoroalkyl)carbinols, when subjected to alkaline permanganate oxidation, undergo a useful scission. When the side chains of these secondary alcohols are unsymmetrical, and, at least $n$ or $m$ is 1, the reaction is unexpectedly specific. Alkaline permanganate oxidatively cleaves the bis(ω-hydroperfluoroalkyl)carbinols to one mol of ω,ω'-dihydroperfluoroalkane and one mol of ω-hydroperfluoro aliphatic carboxylic acid:

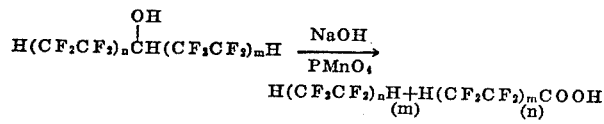

In the case of the unsymmetrical species where at least $n$ or $m$ is 1, for example, 1,3,7-trihydroperfluoroheptan-3-ol, there is a possibility of two cleavages yielding four products:

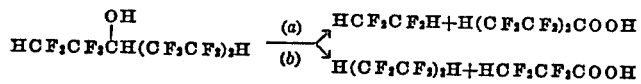

Only products shown in route (b) are obtained indicating a specific scission of the unsymmetrical alcohol. In other unsymmetrical alcohols where neither $n$ nor $m$ is 1, the cleavage is not specific and four products result. Both hydrocarbon products and the acid products are useful compounds. For example, 1,4-dihydrooctafluorobutane, may be fluorinated to perfluorobutane, a known compound, useful as a stable aerosol propellant and as a dielectric gas. The ω-hydroperfluoro aliphatic carboxylic acids, $H(CF_2CF_2)_nCOOH$, are useful as surface active agents and are disclosed in U.S. Patent 2,559,629. Acid oxidation, as shown in Example IV of the present specification, converts the secondary alcohols to the corresponding ω,ω'-dihydroperfluoroketones; these ketones are useful as transformer fluids, as fluids for high-temperature power transmission or hydraulic systems, for use in liquid coupled mechanical drives and the like where a particularly high degree of oxidation and hydraulic stability is needed at elevated temperatures; these compounds are also significantly useful as heat transfer media, particularly in closed systems operating at relatively high temperatures such as those found in modern high-temperature power generating equipment.

Another property of these secondary fluorinated alcohols is their increased acidity over the corresponding primary alcohols. Thus, they are unreactive toward esterification and other usual alcohol reactions; this property is the basis for their preparation as described in this specification. Their acidity lends itself to their use as surface active agents. A very dilute (0.016 wt. percent) aqueous solution of 1,3,7-trihydroperfluoroheptan-3-ol exhibits a surface tension lowering to 60.6 dynes/cm., favorably comparing to known surface active agents as 7-hydroperfluoroheptanoic acid at 70 dynes/cm. and perfluorooctanoic acid at 64 dynes/cm. Over the concentration range 0.015% to 0.5%, 1,3,7-trihydroperfluoroheptan-3-ol is a more effective surface active agent than the prior art secondary alcohol, methyl-4-hydrooctafluorobutylcarbinol (U.S. Patent 2,559,628). The surface tension lowerings over the specified concentration range are 60 to 36.5 dynes/cm. for $$H(CF_2CF_2)_2CH(OH)CF_2CF_2H$$

and 64 to 39.5 dynes/cm. for $H(CF_2CF_2)_2CH(OH)CH_3$.

A most important utility of the bis(ω-hydroperfluoroalkyl)carbinols of this invention is their adaptability to absorption refrigeration systems. A major consideration in such systems is the solubility of refrigerant in solvent. Whether such a system is feasible or not can be determined by the following considerations. The desired high solubility of refrigerant in solvent is indicated by systems which show a negative deviation from Raoult's law, and the greater this deviation, the more feasible the system. A negative deviation from Raoult's law can be determined experimentally by measuring the heat liberated on mixing refrigerant and solvent. As shown, in Example IV of the instant specification, the bis(ω-hydroperfluoroalkyl)carbinols (Nos. 1 and 2) show a heat rise of the magnitude of +10 to +13° C. Other secondary fluorinated alcohols (Nos. 3 and 6) and the primary fluorinated alcohols (Nos. 4 and 5) show a rise of only +4 to +6° C. The significance of these results lies in the fact that where the magnitude of change is below +10° C. there is no possibility of a feasible absorption refrigeration system.

The following representative examples illustrate the present invention.

EXAMPLE I

To a 5800 ml. steel autoclave fitted with anchor-type agitation is fed methanol at a rate of 3.7 lb./hr. and 1.0% di-tert. butyl peroxide as catalyst, the percent based on weight of methanol. After the methanol feed has begun, tetrafluoroethylene at a rate of 4.4 lb./hr. is fed into the autoclave. When the telomerization is carried out at 140° C. and the autoclave is maintained at 630 p.s.i.g., a production rate of 4.1 lbs./hr. (85% conversion) of crude product containing 54% by weight of various 1, 1, ω-trihydroperfluoroalkanols is obtained. A 12-hour run yields 49.2 lbs. of crude corresponding to 26.6 lbs. of fluoroalkanol mixture. The crude is charged to a still and distillation gives:

| Cut No. | B.P., °C., at 200 mm. | Amount in lbs. | Content |
| --- | --- | --- | --- |
| 1 | 50-120 | 7.2 | 3- and 5-carbon fluoroalkanols. |
| 2 | 120-145 | 5.0 | 7-carbon fluoroalkanols. |
| 3 | 145-170 | 4.2 | 9-carbon fluoroalkanols. |
| 4 | 170-185 | 3.5 | 11-carbon fluoroalkanols. |
| 5 | Residue | 6.7 | Residue, >11-carbon fluoroalkanols. |

4.7 lbs. of cut 2, containing approximately 0.0095 lb.-mol of 1,1,7-trihydroperfluoropentan-1-ol, is placed in a 5–1 flask fitted with stirrer, thermometer, and Barrett receiver (water separator trap). To this charge is added 0.87 lbs. (0.00478 lb.-mol) of camphoric anhydride, 600 ml. of toluene, and 5 ml. of concentrated sulfuric acid in order to esterify all primary alcohol in the mixture. By heating for 20–40 hours all the water forming from the esterification is azeotropically distilled. The oil remaining is washed twice with its volume equivalent of 1% by wt. sodium carbonate solution and finally with its volume equivalent of water. After separation, the oil is heated to azeotropically remove residual water and then placed under a vacuum of 5 mm. (Hg) at a maximum pot temperature of 160° C. to strip out toluene, secondary 7-carbon fluoroalkanol and unreacted 1,1,7-trihydroperfluoroheptan-1-ol. This mixture is then distilled yielding 0.26–0.32 lbs. (70–85% recovery) of pure 1,3,7-trihydroperfluoroheptan-3-ol, B.P. 125° C./200 mm. (Hg), $n_D^{20°}$ 1.318, sp. gr. at 20° C.=1.766.

*Analysis.*—Neutral equivalent: Calc'd. 332. Found 333, 338.

Nuclear magnetic resonance spectra show: The proton resonance structure of this product showing the characteristic $CF_2H$ triplet, a $—CH_2O—$ or $>CHO—$, and an $—OH$ doublet. The $—OH$ identification is confirmed by adding a few drops of concentrated $H_2SO_4$, which effectively smears out and shifts the $—OH$ doublet. It is then possible to measure the intensities to find $CF_2H:CH:OH=2:1:1$. Thus, the proton spectra clearly identify the product as a secondary alcohol, since the ratio would be 1:2:1 for a primary alcohol and 3:0:1 for a tertiary alcohol. The basis for chain length identification is both the number and position of lines relative to the intensities of $CF_2H$ versus all other lines in the $F^{19}$ spectra.

Found: Total CF/total $CF_2H$=2.2. Theory=2.0.

EXAMPLE II

A mixture of fluoroalkanols initially obtained by tetrafluoroethylene-methanol telomerization as described in Example I and partially esterified, is shown, after removal of the esters, by vapor phase chromatography to consist of:

| Content: | Weight percent |
|---|---|
| 1,1,5-trihydroperfluoropentan-1-ol | 1.5 |
| 1,1,7-trihydroperfluoroheptan-1-ol | 3.8 |
| 1,1,9-trihydroperfluorononan-1-ol | 31.5 |
| Secondary 9-carbon fluoroalkanol | 61.3 |

2,592 grams of this mixture is refluxed under azeotropic conditions with 210 g. (1.15 mol) of camphoric anhydride, 69 g. (0.345 mol) of camphoric acid, 375 ml. of toluene, 100 ml. of benzene, and 3 ml. of concentrated sulfuric acid. In about 16 hours the theoretical quantity of water is azeotropically distilled. The reaction mixture is washed twice with its volume equivalent of 1% by weight sodium hydroxide solution. During the second wash, an inseparable emulsion may result which can be broken only by the reduction of the pH to about 6. The oil layer is distilled at atmospheric pressure to about 120° C. to remove the bulk of the toluene-benzene solvent. The mixture is then stripped to a pot temperature of 150° C. at 5 mm. (Hg) and the collected distillate is fractionally distilled yielding 1500 g. of secondary 9-carbon fluoroalkanol, B.P. 150° C./200 mm. (Hg), $n_D^{20°}$ 1.319, neutral equivalent 463,469 (theoretical 432), sp. gr. at 20° C.=1.802. Nuclear magnetic resonance analysis shows the product to be a mixture of secondary alcohols composed of about 85% by weight bis(4-hydroperfluorobutyl)carbinol and about 15% by weight 1,3,9-trihydroperfluorononan-3-ol.

*Analysis.*—Total $CF_2$/total $CF_2H$. Found=3.3. Theory=3.0.

EXAMPLE III

*Oxidation of 1,3,7-trihydroperfluoroheptan-3-ol with alkaline permanganate*

Into a mixture of 200 g. of water, 23 g. of potassium permanganate and 4 g. of sodium hydroxide is dropped slowly 32 g. of pure 1,3,7-trihydroperfluoroheptan-3-ol (from Example I). A vigorous reaction is observed, the temperature being held at 80–85° C. by the rate of addition. 15 grams of colorless liquid collects in a receiver immersed in solid carbon dioxide and connected to the reaction flask. This low boiling material (B.P. 44.5° C.) is identified by mass spectrometric analysis to be pure 1,4-dihydrooctafluorobutane (70% yield). The aqueous material remaining in the reaction flask is acidified and extracted with ether after reduction of the manganese dioxide. The ether solution contains an acid which is identified by vapor phase chromatography as tetrafluoropropionic acid, $HCF_2CF_2CO_2H$. No trace of 1,1,2,2-tetrafluoroethane or of 5-hydroperfluorovaleric acid is found.

EXAMPLE IV

*Oxidation of 1,3,7-trihydroperfluoroheptan-3-ol with dichromate in acid to 1,7-dihydroperfluoroheptanone-3*

Into a stirred mixture of 203 g. (0.85 mol) of 1,3,7-trihydroperfluoroheptan-3-ol and 90 ml. of concentrated sulfuric acid at 55° C. is slowly added a solution of 254 g. (0.85 mol) of sodium dichromate in 350 g. of water and 155 ml. of concentrated sulfuric acid. The temperature rises spontaneously to 80° C. at the start, after which the mixture is heated to 100° C. while addition is completed. The reaction mass is stirred at 100° C. for 44 hours, then cooled to room temperature and additional 300 ml. of concentrated sulfuric acid is added. The reaction mass is distilled at 60–100° C. at waterpump pressure. The material collected from receivers cooled by solid $CO_2$ is dried over $P_2O_5$ and then distilled through a spinning-band column. 149 grams (53% yield) of 1,7-dihydroperfluoroheptanone-3, B.P. 111–112° C., is collected.

*Analysis.*—Calc.: Neutral equivalent = 330. Found: Neutral equivalent = 333, 334.

Infrared spectrum of the product shows a sharp carbonyl band at 5.58μ characteristic of fluorinated ketones.

The $F^{19}$ nuclear magnetic resonance spectrum shows bands due to two $CF_2H$ groups. The ketone cannot be symmetrical because the $CF_2H$ groups are not the same, showing a chemical shift of 15 cycles at a frequency of 40 megacycles. The proposed structure is confirmed by comparison to other known compounds and the $CF_2H$ patterns are in a specific region characteristic of $CF_2H$ patterns adjacent to $CF_2$ groups. Also, an intensity ratio of $4CF_2$ to $2CF_2H$ groups obtained is consistent with the proposed structure.

EXAMPLE V

*Heat of mixing*

A 16 mm. I.D. x 150 mm. glass tube is fitted inside a 23 mm. I.D. x 150 mm. glass tube and sealed at the top in such a manner that the walls are separated by about 1½ mm. air space. To the tube is added 2 ml. of absolute methanol solvent. The temperature is recorded with a thermometer of scale +20° C. to +50° C. graduated in $\frac{1}{10}$° C. To this system is added 2 ml. of the fluorinated alcohol to be tested. Quick mixing is effected with an immediate reading of the maximum temperature. The following table illustrates the variation in temperature increase with the structure of the fluorinated alcohol.

TABLE

| No. | Fluorinated Alcohol | Solvent Initial Temp. (° C.) | Temp. On Mixing (° C.) | Increase in Temp. (° C.) |
|---|---|---|---|---|
| 1 | $H(CF_2CF_2)_2\overset{OH}{\underset{|}{C}}HCF_2CF_2H$ | 29.3; 28.7 | 41.4; 40.3 | +13.1; +11.6 |
| 2 | $H(CF_2CF_2)_2\overset{OH}{\underset{|}{C}}H(CF_2CF_2)_2H$ | 29.0; 28.75 | 39.8; 39.1 | +10.8; +10.35 |
| 3 | $H(CF_2CF_2)_2\overset{OH}{\underset{|}{C}}HCH_3$ | 28.75 | 34.4 | +5.65 |
| 4 | $H(CF_2CF_2)_2CH_2OH$ | 28.8 | 33.9 | +5.1 |
| 5 | $H(CF_2CF_2)_3CH_2OH$ | 28.8 | 32.9 | +4.1 |
| 6 | $H(CF_2CF_2)_2\overset{OH}{\underset{|}{C}}HCH_2CH_3$ | 28.9 | 33.6 | +4.7 |

The same effect is observed with other alcohol solvents in addition to such solvents as acetone or diethyl ether.

As many apparently widely different embodiments of this invention may be made without departing from the spirit and scope thereof, it is to be understood that this invention is not limited to the specific embodiments thereof except as defined in the appended claims.

I claim:

1. Process for preparing bis(ω-hydroperfluoroalkyl)-carbinols having the structure

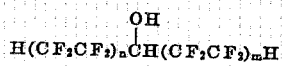

wherein $n$ and $m$ are integers having a value within the range of 1 to 5, which process comprises (a) telomerizing tetrafluoroethylene and methanol by reaction, at a temperature within the range of 50 to 250° C. and a pressure of from 1 to 100 atmospheres, in the presence of a free radical generator selected from the group consisting of peroxides and azo nitriles to produce a mixture of alcohols containing said bis-carbinols and isomeric ω-hydroperfluoroalkyl carbinols having the structure $H(CF_2CF_2)_{n+m}$—$CH_2OH$ wherein $n$ and $m$ are integers having a value within the range of 1 to 5, (b) esterifying the ω-hydroperfluoroalkyl carbinol content of said mixture with an esterification agent selected from the group consisting of a carboxylic acid and a carboxylic acid anhydride, and, (c) distilling the resulting mixture to separate the bis(ω-hydroperfluoroalkyl)carbinols from the esters of said isomeric primary alcohols.

2. The process of claim 1 wherein the ω-hydroperfluoroalkyl carbinols of said mixture are esterified to the corresponding esters of camphoric acid.

3. The process of claim 1 wherein the mixture of alcohols produced by telomerizing according to (a) is separated by distillation into fractions containing bis- and mono-substituted carbinols of an equal number of carbon atoms, followed by esterifying said fractions and distilling the resulting mixture as in said claim 1.

References Cited in the file of this patent

UNITED STATES PATENTS

| 2,072,806 | Wood | Mar. 2, 1937 |
| 2,559,628 | Joyce | July 10, 1951 |

OTHER REFERENCES

Fieser et al., Organic Chemistry (2nd ed.), pp. 176–7 (1950).